United States Patent [19]
Ghaem

[11] Patent Number: 5,335,361
[45] Date of Patent: Aug. 2, 1994

[54] INTEGRATED CIRCUIT MODULE WITH DEVICES INTERCONNECTED BY ELECTROMAGNETIC WAVES

[75] Inventor: Sanjar Ghaem, Palatine, Ill.

[73] Assignee: Motorola, Inc., Schaumburg, Ill.

[21] Appl. No.: 805,222

[22] Filed: Dec. 11, 1991

[51] Int. Cl.5 .................. H04B 7/02; G02F 1/015
[52] U.S. Cl. ..................... 455/66; 359/152; 359/163; 257/82; 257/98
[58] Field of Search ............ 359/163, 169, 170, 152, 359/153, 162, 173, 159, 222; 455/41, 66; 257/80, 81, 82, 84, 85, 98

[56] References Cited

U.S. PATENT DOCUMENTS

| | | | |
|---|---|---|---|
| 3,963,920 | 6/1976 | Palmer | 250/239 |
| 4,695,120 | 9/1987 | Holder | 257/82 |
| 4,774,561 | 9/1988 | Takagi | 257/529 |
| 4,845,052 | 7/1989 | Abend | 427/209 |
| 4,850,044 | 7/1989 | Block | 359/63 |
| 4,851,695 | 7/1989 | Stein | 257/82 |
| 4,862,231 | 8/1989 | Abend | 257/81 |
| 4,970,724 | 11/1990 | Yung | 371/9.1 |
| 4,987,295 | 1/1991 | Kinnard et al. | 257/229 |
| 5,008,833 | 4/1991 | Agranat et al. | 395/25 |
| 5,051,790 | 11/1991 | Hammer | 257/80 |
| 5,280,184 | 1/1994 | Jokerst et al. | 257/84 |

FOREIGN PATENT DOCUMENTS

| | | | |
|---|---|---|---|
| 3305044 | 8/1984 | Fed. Rep. of Germany | 359/163 |
| 0200644 | 11/1983 | Japan | 359/163 |
| 1082680 | 3/1989 | Japan | 257/84 |
| 0058636 | 3/1991 | Japan | 359/170 |
| 2150382 | 6/1985 | United Kingdom | 359/163 |
| 2152749 | 8/1985 | United Kingdom . | |
| 8706411 | 10/1987 | United Kingdom | 359/163 |

OTHER PUBLICATIONS

*International Technology Disclosures*, "3D Packaging and Vertical Integration of Electronic/Photonic Circuits," author unknown, Apr. 25, 1990.
*The MIT Report*, "High-Speed Optical Interconnections," Sep. 1991.

Primary Examiner—Edward F. Urban
Assistant Examiner—Mark D. Wisler
Attorney, Agent, or Firm—John H. Moore

[57] ABSTRACT

An integrated circuit module (501), with enclosed semiconductor devices (107, 115), includes a housing (101) with an electromagnetic wave reflective interior surface (103). A transmitter (105), mounted on a semiconductor device (107), transmits signals derived from a semiconductor device (107). An electromagnetic wave receiver (113), is positioned in the housing (101) such that it receives a transmitted wave via a reflective surface (103) along an electromagnetic wave path (117) from the transmitter (105).

26 Claims, 2 Drawing Sheets

INTEGRATED CIRCUIT MODULE WITH DEVICES INTERCONNECTED BY ELECTROMAGNETIC WAVES

FIELD OF THE INVENTION

This invention is directed generally to the field of integrated circuit packaging, and more particularly to techniques for connecting signal paths between devices within an integrated circuit module.

BACKGROUND OF THE INVENTION

Today, multi-chip, and other integrated circuit, modules rely on electrical conductors for connecting signal paths. Using these electrical conductors imposes many limits on the performance of these modules.

There are two primary limits related to communication. The first area of limit is communication speed. Electrical conductors have resistive and inductive characteristics, based on their physical dimensions. The maximum speed of communication will be limited because the conductor electrical characteristics will limit the speed at which the signal can be propagated. This is caused by the inductive characteristic of the conductor will resist the change in current flow as the signal changes state. Also, the resistive characteristic will limit the rate of current flow into the receiving circuit, typically capacitive in nature.

The second area of limit is commonly known as a communication race condition. This happens when a sending device communicates a signal to more than one receiving device through electrical conductors at unequal distances from the sending device. Combined with the electrical conductor characteristics earlier stated, the signal will arrive at the receiving devices at different times. This is a problem in systems relying on simultaneous operation of parallel circuits.

Another limit of electrical conductors is the electromagnetic interference effect. Electrical conductors act like antennas that both emit and receive unwanted electromagnetic signals. This causes improper device operation.

Electrical conductors also limit the size of a module because they take up space. This space includes the space needed for the physical electrical conductors and the space needed for insulation between electrical conductors. Also, sometimes, a clearance space is needed for an assembly machine to connect the electrical conductors. These space requirements make it difficult to minimize the size of the module.

Using electrical conductors limits the complexity of connections practical in a module. Some connection requirements are so complex that the designer must resort to multi-layered, or multi-dimensional, connections that adversely effect reliability and are difficult to manufacture. As modules get more functions, a mix of various analog and digital technologies are used. The electrical interface between these different technologies is sometimes difficult when using direct electrical connections because additional interface circuits are often necessary.

The inflexibility of electrical connections also limits system performance because the flexible substitution of redundant circuits is not possible. There are several reasons for wanting this flexibility; including the substitution of functioning circuits for faulty circuits to improve fault tolerant operation. Another reason for flexible substitution is for dynamic problem distribution in a system that breaks down a problem into small pieces for parallel solution, such as a parallel computer.

In summary, using electrical conductors for connecting signal paths between devices within an integrated circuit module is problematic. These problems include a limit to communication speed between devices and communication race conditions between more than two devices because of the physical characteristics of the electrical conductor. Other limits include faulty device operation because of electromagnetic wave interference, the difficulty of module size minimization, the practicality of complex connections, interface between different technologies, and the inflexibility of connections for circuit substitution.

SUMMARY OF THE INVENTION

An integrated circuit module, with enclosed semiconductor devices, includes a housing that preferably has an electromagnetic wave reflective interior surface. A transmitter, mounted on a semiconductor device, transmits signals derived from the semiconductor device. An electromagnetic wave receiver, is positioned in the housing such that it receives a transmitted wave via a reflective surface along an electromagnetic wave path from a transmitter.

BRIEF DESCRIPTION OF THE DRAWINGS

Understanding the present embodiment will be easier when read with the accompanying drawings in which.

DETAILED DESCRIPTION OF A PREFERRED EMBODIMENT

In a preferred embodiment I describe a packaging system using electromagnetic wave paths to connect semiconductor devices. These electromagnetic wave paths replace the conventional electrical conductors to overcome the many deficiencies of the prior art. These semiconductor devices could be of any variety, size or technology. In the preferred embodiment I use an array of microprocessors.

First, I show a solution fixing the communication limits imposed by prior art, including speed and race conditions. In the preferred embodiment I use electromagnetic wave transmitters and receivers, instead of electrical conductors, for connecting signal paths between semiconductor devices. For the remaining discussion the term transceiver will be used interchangeably with, and considered equivalent to, a paired electromagnetic wave transmitter and electromagnetic wave receiver. I will show several different communication paths to illustrate the power and flexibility of this embodiment.

Figures 1, 5:
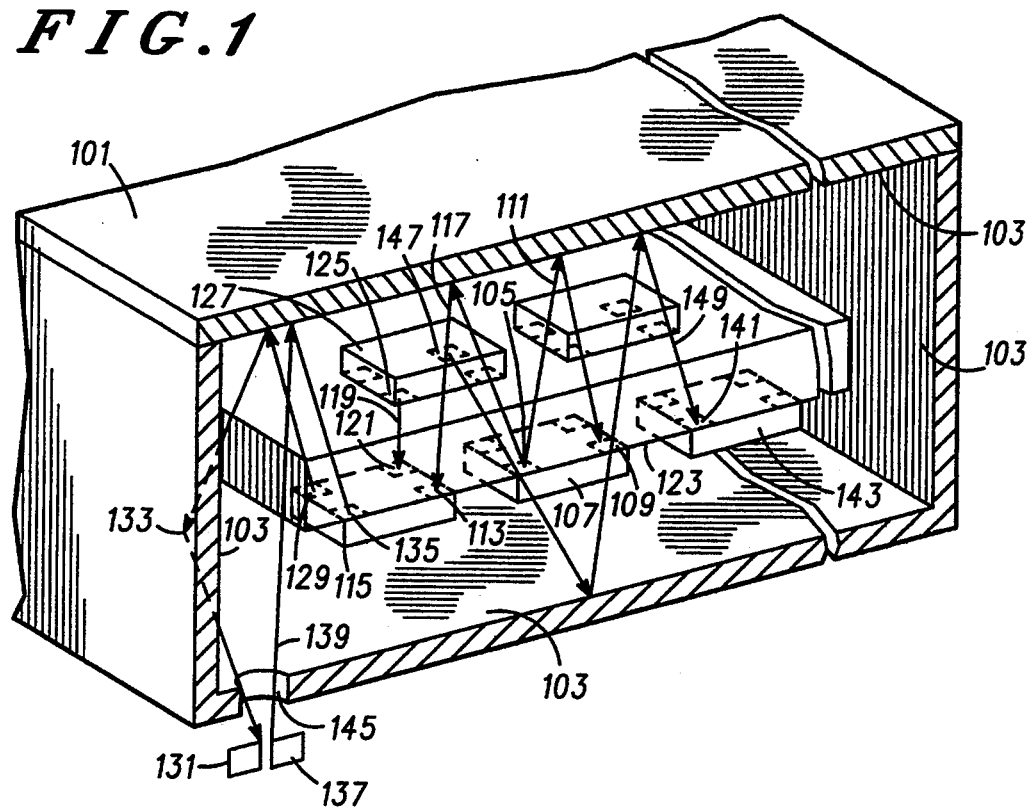
FIG. 1 is a cross section diagram of an integrated circuit module as described in a preferred embodiment.
FIG. 5 is an isometric diagram of an integrated circuit module as described in a preferred embodiment.

In FIG. 1, I show a cross section of a multi-chip integrated circuit module. This module is comprised of a housing 101, with an electromagnetic wave reflective interior surface 103. The housing is injection molded using a carbon filled polyester material. The carbon filler will minimize the transmission and reception of unwanted electromagnetic waves through the housing's walls. The interior of the housing is treated to have a high reflectivity index by plating a chromium based material on its surface. This treatment enables the electromagnetic waves to reflect off the housing's interior surface 103. Of course, other housing materials and reflective surface treatments can be used. In the preferred embodiment the complete interior surface is treated to make it all reflective. There are reasons to selectively coat the surface that I will detail later.

Inside the housing 101 is an electromagnetic wave transmitter 105 situated on an integrated circuit 107. This transmitter 105 is a light emitting diode, or LED. Of course, other transmitters such as laser diodes can be used. The wavelength of emission depends on the material used to dope the LED's PN junction. Here, I use doping to produce an infrared spectrum. The integrated circuit is a microprocessor. An electromagnetic wave receiver 109 is also situated on an opposite corner of the same integrated circuit 107. The receiver 109 is built using a PIN photodiode. This PIN photodiode is also doped to receive the infrared spectrum. Of course, the receiver can be built using other devices such as an avalanche photodiode, a phototransistor, or a photomultiplier. The alignment of the transmitter 105 and the receiver 109 is such that when the transmitter 105 transmits an electromagnetic wave it follows a path 111 via the reflective surface 103 to the receiver 109.

Alternatively, another receiver 113 is mounted on another microprocessor, 115. This receiver 113 is aligned such that it receives the same information signals, transmitted from the transmitter 105, along an alternate electromagnetic wave path 117 via the reflective surface 103.

Another path, 149 is traversed by an infrared wave broadcast from a transmitter 147, located on a microprocessor 127, mounted on the top of a glass substrate 123, to a receiver 141, located on another microprocessor 143 on the bottom of the glass substrate 123. This transmitter 147 is in a location that makes it a global transmitter. This means it has no counterpart receiver aligned directly below it. Because of this, it operates in a broadcast mode transmitting a high energy signal, reflecting off many surfaces including the interior housing surface and, sometimes, off integrated circuit devices. This is desirable in order that all receivers can receive the broadcast signal. This is a useful way to communicate system clock information signals, emergency shutdown, or any high priority signal to the system's receivers. Other examples of broadcast transmission in FIG. 1 include the 111, and 117 wave paths. I can selectively restrict the broadcast by many techniques. A few techniques will be detailed later. Of course, substrate materials, other than glass that are electromagnetic wave transparent can be used.

As described earlier, the cause of the communication speed limit, characteristic of electrical conductors, is the electrical impedance caused by their physical construction. For a transceiver, such as those in FIG. 1, the communication medium is gaseous. This medium causes an immeasurable delay, yielding a significantly higher rate of communication than the electrical conductor.

Therefore, the two electromagnetic wave receivers 109 and 113 will simultaneously receive the transmitted information signals from the transmitter 105. This is true though the electromagnetic wave receivers 109 and 113 are at different distances from the transmitter 105. Because of this, instant transceiving, the microprocessors 107 and 115 can operate on the communicated information signals simultaneously, without concern for a communication race condition.

Sometimes, it is also desirable to have a direct, or substantially straight, communication path. In FIG. 1 I further illustrate an example of a direct communication path. This path 119 is between a transmitter 125, located on a microprocessor 127, a glass substrate 123, and a receiver 121, mounted on the microprocessor 115. Because the transmitter 125 is spaced very close to the receiver 121, I use a low power transmitter.

I now show communications with external signals. Transmitter 129 is positioned such that when it emits an electromagnetic wave to the external receiver 131 it follows a predetermined electromagnetic wave path 133 that includes the housing's reflective interior surface 103, and an electromagnetic wave passageway 145. Using the housing's reflective interior surface 103 enables devices positioned at different locations, within the housing, to output signals to an external receiver 131.

Similarly, an electromagnetic wave receiver 135 is positioned such that when an external transmitter 137 emits a wave, it follows a predetermined electromagnetic wave path 139 that includes an electromagnetic wave passageway 145, and the housing's reflective interior surface 103. Using the housing's reflective interior surface 103 enables devices positioned at different locations, within the housing, to receive signals from the external transmitter 137. One skilled in the art might recognize this flexibility as a meaningful advantage.

The next limit considered is electromagnetic interference. Because electrical conductors are now replaced with transceivers, the communications medium no longer acts like an antenna. This eliminates the electromagnetic interference caused by the communications medium.

Figure 2:
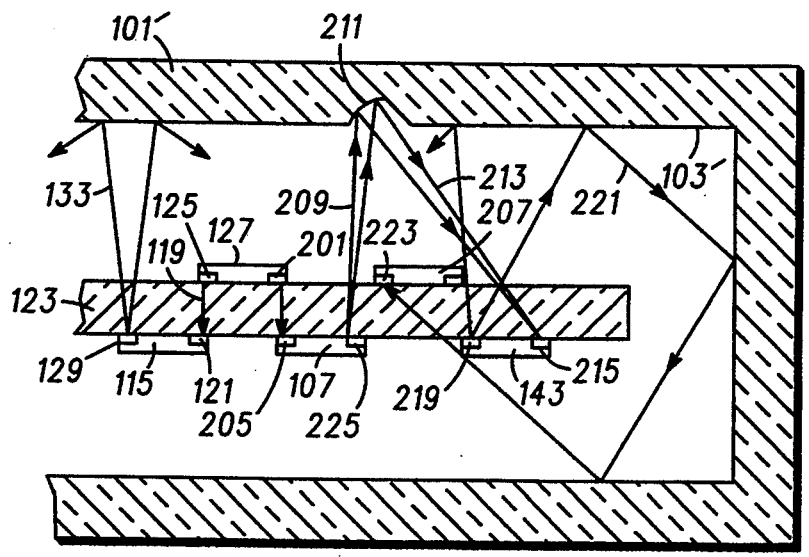
FIG. 2 is a detailed view of a reflective surface as described in a preferred embodiment.

To eliminate potential direct interference, and allow simultaneous communications between transceivers, I use several techniques. The first is the use of different wavelength transceivers. Referring to FIG. 2 I show a red light transmitter 219, located on a microprocessor 143, transmitting a red light wave along an electromagnetic wave path 221 to a red light receiver 223, located on a microprocessor 207. Because the spectrum transceived between these elements is not infrared, the transceiver pair 213 and 223 can communicate with each other without interference from or to the infrared transceivers in the module. Of course, other spectrums can be used.

Another technique enabling simultaneous communication without interference is shown in FIG. 2. The transmitter 225, located on a microprocessor 107, and receiver 215, located on a microprocessor 143, are positioned such that an infrared wave is transmitted along a path 209. When the wave meets the concave geometry 211 of the reflective surface 103' it becomes focused 213 and reflects to the receiver 215. This is an example of using distinct paths. Using these distinct paths I can simultaneously communicate signals between transceivers with out interfering with other transceivers. Of course, many surface geometries and treatments can be designed to get various focusing, steering, piping, baffling, diffusing, and/or trapping effects. These surface geometries and treatments can be easily molded into the housing or applied in a secondary operation. Of course, I can also use message coding techniques to achieve the same thing. Here the transmitter would include a coded address to the receiver, or receivers, of choice. Although many receivers could listen only the addressed receiver, or receivers, would continue to listen to the message as it continued to transmit. Of course, time division or frequency division multiplexing could be used to achieve a like result.

As the above examples show, the complexity of connections limit of electrical conductor technology, is easily overcome with the present embodiment.

Next I discuss the space limit imposed by electrical conductor technology. FIG. 2 also shows that the integrated circuits 107, 115, 127, 143 and 207 are spaced very closely together. With electromagnetic wave interconnections this compact packaging is possible. This allows us to construct modules smaller than possible with existing electrical conductor interconnects. As stated earlier, the communication of signals into and out of the module by electromagnetic waves, eliminates the need for a large, bulky electrical connector and simplifies module sealing.

Figure 3:
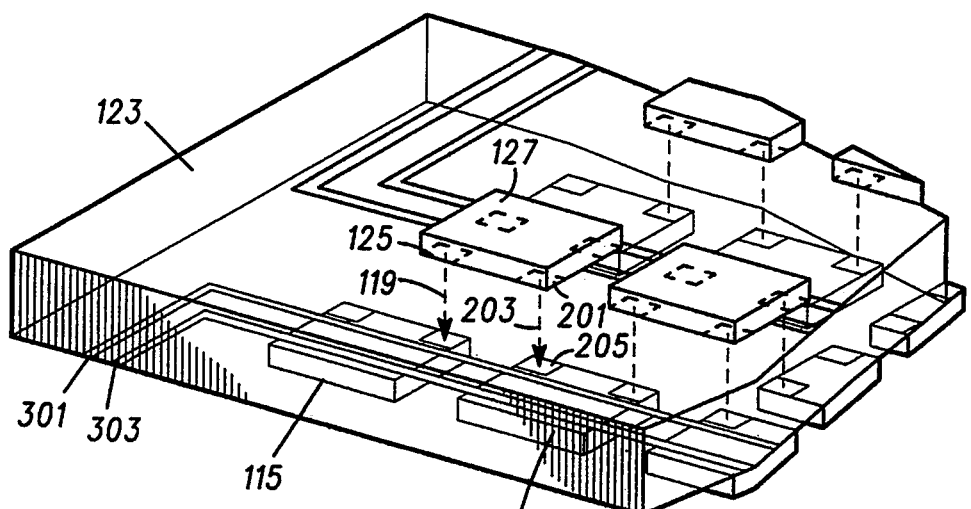
FIG. 3 is an exploded view highlighting the alignment between optical devices on opposing surfaces of a substrate as described in a preferred embodiment.

Continuing our discussion please turn to FIG. 3. This figure shows the substrate 123 in a more detailed view. It illustrates conductors 301 and 303 for carrying power to the microprocessors 115 and 107. Here the conductors, 301 and 303, are disposed on the glass substrate 123 and the microprocessors 115 and 107 are disposed on top of the conductors.

This view also shows an isometric perspective of the microprocessors 127, 115, 107. It includes another example of a direct electromagnetic wave information signal path 203 from transmitter 201 to receiver 205. Also it shows another perspective of the path 199 from FIG. 1.

I now show the case of correcting the limit of flexibility of signal interconnects. The needs for flexibility include, substitution of function for fault tolerance, load distribution, and function busy substitution.

With the electromagnetically interconnected integrated circuit elements I can flexibly substitute redundant elements for faulty ones. When microprocessor 127 asks for a calculation from microprocessor 143 and fails to receive the result, using its broadcast transception capability, microprocessor 127 can ask microprocessor 107 for the calculation.

Function busy substitution is an important concern in many systems. When a microprocessor queries a first microprocessor for a calculation and finds it busy, it can query a second microprocessor for the calculation.

Load distribution is also an important concern in many highly parallel architectures. In these systems, many parallel operating microprocessors solve a problem by breaking it up into smaller problems to be solved simultaneously. After initial load distribution, as the solution progresses, the load distribution can become unbalanced. With the flexible interconnect provided by the electromagnetic wave transception architecture I can dynamically redistribute the load, solving the problem faster.

Flexibility of interconnect not only increases system throughput speed, by function busy substitution and load distribution, but also enhances fault tolerance performance, enhancing reliability.

Figure 4:
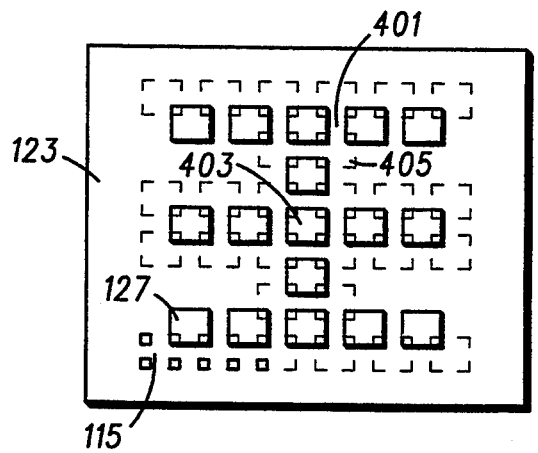
FIG. 4 is a schematic diagram of a hierarchical device architecture as described in a preferred embodiment.

Please turn to FIG. 4. This view illustrates the complete substrate, showing an array of microprocessors. This array includes microprocessors on both sides of the substrate 123, with transmitters and receivers mounted on the corners of the microprocessors.

Some microprocessors 403 have only direct transceiving capability. And other microprocessors 115, and 127 have both direct and broadcast transceiving capability. Of course, microprocessor 403 can send a broadcast transmission using microprocessor 401. This is accomplished by sending a signal from microprocessor 403 to microprocessor 401 requesting a broadcast transmission from transmitter 405. A broadcast receive operation follows a like process.

These microprocessors are arranged in a hierarchical network. Each microprocessor represents a synapse of a neural model. The microprocessor 401 receives processed information signals from subordinate synapses. This neural network implementation relies on the electromagnetic wave interconnect system for very high speed, race free, communications. It also relies on compact size, complexity of interconnects and flexibility of interconnects to achieve superior performance. Although in this embodiment I don't apply mixed technologies, the electromagnetic wave interconnect system will aid interconnect in an embodiment that needs these mixed technologies.

And lastly I show, in FIG. 5, a complete module 501 benefiting from the electromagnetic wave interconnect system. This includes a housing constructed of elements 503 and 505, with an electromagnetic wave passageway 145. The reflective surface includes the entire interior 103. The glass substrate 123 has the neural network array of microprocessors including 127, 115, 107 and 143 as examples.

What is claimed is:
1. An integrated circuit module comprising:
   a housing having at least one electromagnetic wave reflective interior surface;
   an essentially planar substrate having a first and an opposing second surface, said first and opposing second surfaces disposed inside said housing;
   a first conductor disposed on said first surface;
   a first semiconductor device disposed on said first surface and connected to said first conductor;
   an electromagnetic wave transmitter, for sending information signals derived from said first semiconductor device, disposed on said first surface and coupled to said first conductor;
   a second conductor disposed on said opposing second surface;
   a second semiconductor device disposed on said opposing second surface and connected to said second conductor; and
   an electromagnetic wave receiver disposed on said opposing second surface and coupled to said second conductor, said electromagnetic wave receiver receiving said information signals from said electromagnetic wave transmitter and providing said information signals to said second semiconductor device, wherein said electromagnetic wave transmitter, said at least one electromagnetic wave reflective interior surface, and said electromagnetic wave receiver are positioned to establish an electromagnetic wave path for communicating said information signals from said electromagnetic wave transmitter, via said at least one electromagnetic wave reflective interior surface, to said electromagnetic wave receiver.

2. An integrated circuit module in accordance with claim 1 wherein said semiconductor device further comprises an integrated circuit.

3. An integrated circuit module in accordance with claim 1 wherein said electromagnetic wave transmitter is integrated directly on said first semiconductor device.

4. An integrated circuit module in accordance with claim 3 wherein said electromagnetic wave receiver is integrated directly on said second semiconductor device.

5. An integrated circuit module in accordance with claim 1 further comprising:
   an additional electromagnetic wave transmitter disposed in said housing; and
   an additional electromagnetic wave receiver disposed inside said housing for receiving additional information signals from said additional electromagnetic wave transmitter, wherein said additional electromagnetic wave transmitter and said additional electromagnetic wave receiver are positioned to establish a substantially straight electromagnetic wave path for communicating said additional information signals from said additional electromagnetic wave transmitter to said additional electromagnetic wave receiver.

6. An integrated circuit module in accordance with claim 4 further comprising:
   an additional electromagnetic wave transmitter disposed in said housing;
   an additional electromagnetic wave receiver disposed inside said housing for receiving additional information signals from said additional electromagnetic wave transmitter, wherein said additional electromagnetic wave transmitter and said additional electromagnetic wave receiver are positioned to establish a substantially straight electromagnetic wave path for communicating said additional information signals from said additional electromagnetic wave transmitter to said additional electromagnetic wave receiver;
   an electromagnetic wave passageway through said housing;
   an external electromagnetic wave transmitter disposed outside said housing and providing input information signals to at least one electromagnetic wave receiver positioned within the housing, wherein said external electromagnetic wave transmitter, said electromagnetic wave passageway, said at least one electromagnetic wave reflective interior surface, and said at least one electromagnetic wave receiver are positioned to establish an external input electromagnetic wave path for communicating said input information signals from said external electromagnetic wave transmitter, via said electromagnetic wave passageway and said at least one electromagnetic wave reflective interior surface, to said at least one electromagnetic wave receiver; and
   an external electromagnetic wave receiver disposed outside said housing and for receiving output information signals from at least one electromagnetic wave transmitter positioned within the housing, wherein said at least one electromagnetic wave transmitter, said at least one electromagnetic wave reflective interior surface, said electromagnetic wave passageway, and said external electromagnetic wave receiver are positioned to establish an external output electromagnetic wave path for communicating said output information signals from said at least one electromagnetic wave transmitter, via said at least one electromagnetic wave reflective interior surface, and said electromagnetic wave passageway to said external electromagnetic wave receiver.

7. An integrated circuit module comprising:
   a housing;
   an essentially planar, electromagnetic wave transparent, substrate having a first and opposing second surface, said first and opposing second surfaces disposed in said housing;
   a first conductor for carrying power disposed on said first surface;
   an electromagnetic wave transmitter, for transmitting information signals, disposed on said first surface and connected to said first conductor;
   a second conductor for carrying power disposed on said opposing second surface; and
   an electromagnetic wave receiver disposed on said opposing second surface and coupled to said conductor, wherein said electromagnetic wave transmitter, said essentially planer electromagnetic wave transparent substrate and said electromagnetic wave receiver are positioned to establish a substantially straight electromagnetic wave path through said essentially planer, electromagnetic wave transparent, substrate for communicating said information signals from said electromagnetic wave transmitter through said essentially planar, electromagnetic wave transparent, substrate to said electromagnetic wave receiver.

8. An integrated circuit module in accordance with claim 7 wherein said electromagnetic wave transmitter is integrated on a first semiconductor device mounted on said first surface and wherein said electromagnetic wave receiver is integrated on a second semiconductor device mounted on said opposing second surface.

9. An integrated circuit module in accordance with claim 8 wherein each of said first and second semiconductor devices comprises a semiconductor different in at least two different corners, and wherein at least one electromagnetic wave transmitter/receiver is positioned at each of said two corners of each of said semiconductor devices.

10. An integrated circuit module in accordance with claim 9 wherein at least one of said electromagnetic wave transmitter/receiver of said first semiconductor device is positioned directly opposite from a complementary one of at least one of said electromagnetic wave transmitter/receivers of said second semiconductor device for communicating with said at least one semiconductor device on said first surface through the essentially planar, electromagnetic wave transparent, substrate.

11. An integrated circuit module comprising:
   an essentially planar, electromagnetic wave transparent, substrate having a first and an opposing second sun ace, said first and second surfaces disposed inside a housing;
   a first semiconductor device having at least two corners and disposed on said first surface and wherein at least one of an electromagnetic wave transmitter/receiver is positioned at each of said at least two corners;
   a second semiconductor device having at least two corners and disposed on said first surface and wherein at least one to an electromagnetic wave transmitter/receiver is positioned at each to said at least two corners; and a third semiconductor device having at least two corners and disposed on said second surface and wherein at least one of an electromagnetic wave transmitter/receiver is positioned at each of said at least two corners so as to communicate via a direct path with said at least one of an electromagnetic wave transmitter/receiver of said first semiconductor device and via a direct path with said at least one of an electromagnetic wave transmitter/receiver of said second semiconductor device.

12. An integrated circuit module in accordance with claim 11 wherein said direct paths pass through said essentially planar, electromagnetic wave transparent, substrate.

13. An integrated circuit module in accordance with claim 11 wherein an information signal is communicated from the first semiconductor device to the third semiconductor device over a path from one of the electromagnetic wave transmitter/receivers of the first semiconductor device, via one of the electromagnetic wave transmitter/receivers of the second semiconductor device, via another one of the electromagnetic wave transmitter/receivers of the second semiconductor device, to one of the electromagnetic wave transmitter/receivers of the third semiconductor device.

14. An integrated circuit module in accordance with claim 1 wherein said housing reflective interior surface has a portion shaped for focusing said information signals sent from said transmitter to said receiver.

15. An integrated circuit module in accordance with claim 7 wherein said electromagnetic wave transmitter comprises a light transmitter, said electromagnetic wave receiver comprises a light receiver and wherein said substrate is light transparent.

16. An integrated circuit module in accordance with claim 15 wherein said substrate is a glass substrate.

17. An integrated circuit module in accordance with claim 7 wherein said electromagnetic wave transmitter is disposed adjacent said first surface of said substrate and wherein said electromagnetic wave receiver is disposed adjacent said opposing second surface of said substrate.

18. An integrated circuit module in accordance with claim 17 wherein said substrate has a thickness and wherein said straight electromagnetic wave path through said substrate is substantially equal to said substrate thickness.

19. An integrated circuit module in accordance with claim 15 wherein said electromagnetic wave transmitter is disposed adjacent said first surface of said substrate and wherein said electromagnetic wave receiver is disposed adjacent said opposing second surface of said substrate.

20. An integrated circuit module in accordance with claim 19 wherein said substrate has a thickness and wherein said straight electromagnetic wave path through said substrate is substantially equal to said substrate thickness.

21. An integrated circuit module in accordance with claim 12 wherein said electromagnetic transmitters/receivers comprises light transmitters and receivers arid wherein said substrate is light transparent.

22. An integrated circuit module in accordance with claim 21 wherein said substrate is a glass substrate.

23. An integrated circuit module in accordance with claim 12 wherein each of said transmitters/receivers is positioned adjacent one of said substrate surfaces.

24. An integrated circuit module in accordance with claim 23 wherein said substrate has a thickness and wherein said direct paths are substantially equal to said substrate thickness.

25. An integrated circuit module in accordance with claim 21 wherein said substrate has a thickness and wherein said direct paths are substantially equal to said substrate thickness.

26. An integrated circuit module in accordance with claim 25 wherein said substrate is a glass substrate.

* * * * *